(12) United States Patent
Korhonen et al.

(10) Patent No.: US 7,593,748 B2
(45) Date of Patent: Sep. 22, 2009

(54) USER INTERFACE FOR A PORTABLE TELECOMMUNICATION DEVICE

(76) Inventors: Panu Korhonen, Vallirinne 11 A, Fin-00430 Helsinki (FI); Topi Kaaresoja, Vartiosaari AS.2, Fin-00830 Helsinki (FI)

( * ) Notice: Subject to any disclaimer, the term of this patent is extended or adjusted under 35 U.S.C. 154(b) by 379 days.

(21) Appl. No.: 10/509,528

(22) PCT Filed: Mar. 5, 2003

(86) PCT No.: PCT/FI03/00162

§ 371 (c)(1),
(2), (4) Date: Sep. 24, 2004

(87) PCT Pub. No.: WO03/081879

PCT Pub. Date: Oct. 2, 2003

(65) Prior Publication Data

US 2005/0130695 A1 Jun. 16, 2005

(30) Foreign Application Priority Data

Mar. 26, 2002 (FI) ................................. 20020582

(51) Int. Cl.
*H04M 1/00* (2006.01)
(52) U.S. Cl. ..................... 455/550.1; 340/7.6
(58) Field of Classification Search .............. 455/550.1, 455/569.1, 566, 575.1, 567; 340/7.6, 407.1
See application file for complete search history.

(56) References Cited

U.S. PATENT DOCUMENTS 5,379,032 A 1/1995 Foster et al. ............ 340/825.46
6,195,571 B1 2/2001 Osuge ........................ 455/567
6,411,828 B1 * 6/2002 Lands et al. ............. 455/569.1
2001/0020937 A1 * 9/2001 Rosenberg et al. .......... 345/184

FOREIGN PATENT DOCUMENTS

| EP | 000973138 A2 * | 1/2000 |
|----|---|---|
| EP | 0973138 A2 | 1/2000 |
| EP | 000973138 A2 * | 1/2000 |
| EP | 1109378 A2 | 6/2001 |
| GB | 2358336 * | 7/2001 |
| GB | 2358336 A | 7/2001 |
| WO | WO-99/18495 A2 | 4/1999 |
| WO | WO-01/27735 A1 | 4/2001 |

* cited by examiner

*Primary Examiner*—Duc Nguyen
*Assistant Examiner*—Angelica M Perez

(57) ABSTRACT

User interface for providing operational input to a portable telecommunication device without using keys or corresponding manual input means, wherein the interface comprises an electromechanical actuator including an electrical drive means provided with supply means for electrical drive means provided with supply means for electrical power and a movable means arranged in relation to the drive means in such a way that the movable means performs a mechanical movement when electrical power is supplied to the drive means, and wherein an electric signal is induced in the drive means when the portable telecommunication device is moved in a way that causes the movable means to move, a sensing unit for sensing the induced electrical signal, and a control means for controlling a desired operation of portable telecommunication device by means of the signal induced in the drive means.

16 Claims, 3 Drawing Sheets

Fig.1
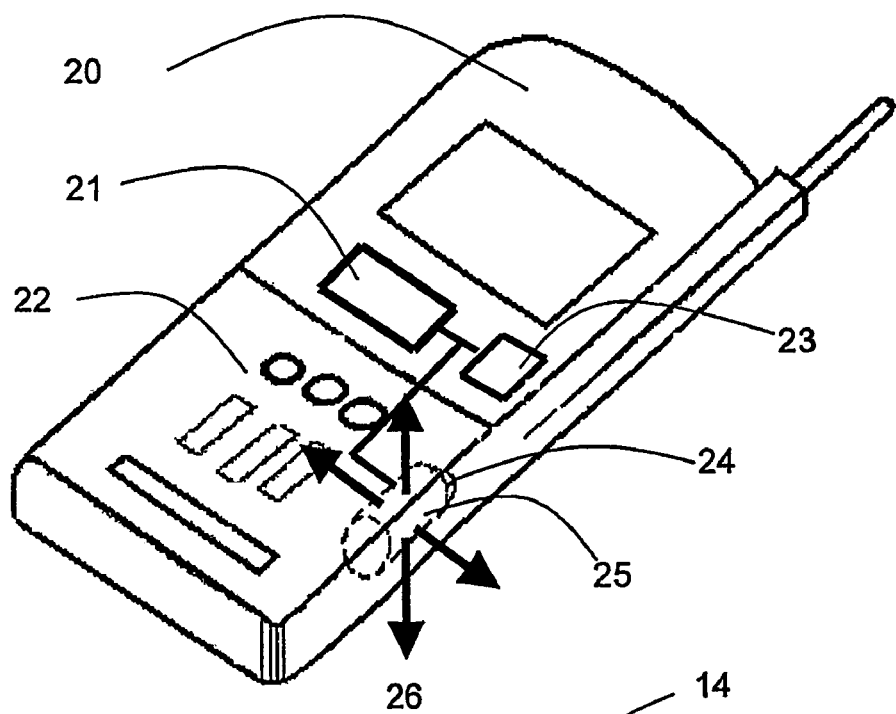
Fig.2
Fig.3
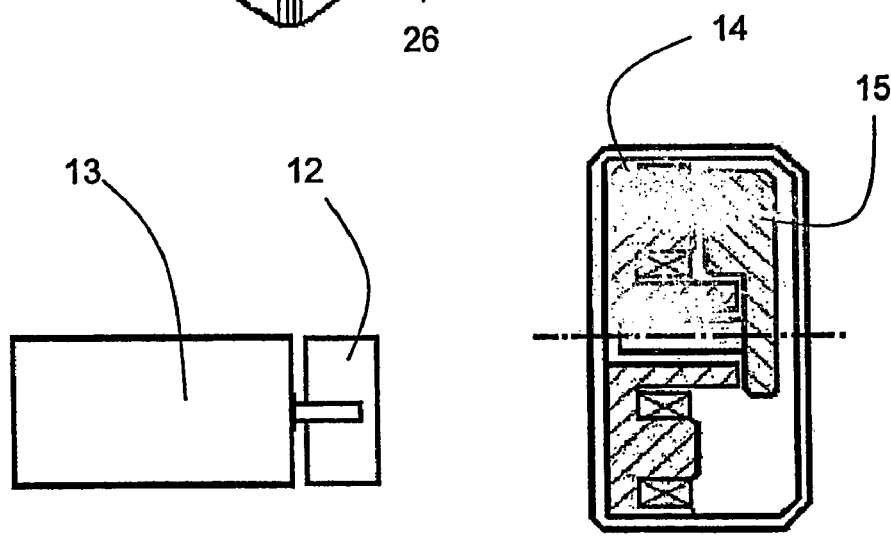

USER INTERFACE FOR A PORTABLE TELECOMMUNICATION DEVICE

FIELD OF THE INVENTION

The present invention relates to a user interface for providing operational input to a portable telecommunication device, such as a mobile phone, mobile terminal, media phone etc. The present invention relates especially to a user interface for providing operational input to a portable telecommunication device without using keys or corresponding manual input means for providing operational input in a portable telecommunication device.

BACKGROUND OF THE INVENTION

In mobile phones the operational input provided by the user in order to control the operation of the mobile phone is generally provided by keys in a keypad. For example a telephone number is usually dialed by pressing dialing keys. However, there are situations when it would be reasonable for example to select a telephone number or to provide some other control commands by using a system where it is not necessary to use the keys in the keypad.

U.S. Pat. No. 6,314,166B1 presents a method for dialing a telephone number by voice commands, i.e. without pressing keys in a keypad. Thus the user can select a telephone number by simply speaking it to the microphone of the mobile phone. The electric signal generated by the microphone is amplified in a microphone amplifier, filtered in a filter and digitized by a Analog to Digital-Converter (ADC) or alternatively digitized by a audio Coding and Decoding unit (CODEC) and thereafter voice recognition is performed on the resulting digital audio signal by a recognizer unit, typically a Digital Signal Processor (DSP), in order to parse the various commands, names, letters and numbers used in Voice Dialing.

The recognizer unit has a control unit, a processor, a speech pattern memory and a program memory containing the needed control and recognition algorithms. The recognition can also be performed for the user by a network element in the cellular system. In this case only the initiating of voice control needs to be performed by the mobile phone.

The mobile phone can also be used as a conventional mobile phone, wherein the dialing of the telephone number can be performed by using the keypad in the usual manner. In the voice controlled mode audio signals are received via the microphone, amplified in the microphone, amplifier, filtered and digitized and conducted in digital form to the recognizer unit. On the basis of the audio signal received, the recognizer unit calculates the corresponding one or several feature vectors which are processed by the recognizer unit in order to find out which command or number was uttered by the user. This kind of "key-free" operation mode is very useful for example in automobiles as so-called hands-free modes, wherein the driver of the vehicle does not need to loose hold of the steering wheel for dialing a telephone number.

However, voice recognition is relatively complicated and prone to recognition errors in a noisy environment, for example where the voices of other persons can be heard. Therefore the voice recognition for voice dialing is normally only activated when needed, otherwise normal ongoing conversations might trigger embarrassing or costly calls. Thus the initiating of voice control mode like voice dialing is seldom done by voice commands. The preferred method has been to use a special button to initiate voice control mode. However, in modern cellular phones the trend is to have as few buttons as possible. Thus the same button is used as a soft key for many purposes depending on the functional mode. Finding the right key combinations without looking at the keys or the display is not easy and by itself negates the convenience of voice dialing in prior art mobile phones.

SUMMARY OF THE INVENTION

The object of the present invention is to eliminate the disadvantages of the prior art and to provide a new type of a user interface for portable telecommunications devices. The invented user interface can be used to initiate for example voice dialing or any other function in a mobile telecommunication device. It can also be used to initiate a further step from a set of further steps possible at a certain point in the execution of a state machine type of functional control. Typically one choice in a menu can be activated by the invented user interface.

The present invention is based of electrically detecting when the user moves or shakes the terminal. FIG. 5 depicts a previous user movement detector as disclosed by U.S. Pat. No. 6,195,571. A metallic weight 51 is affixed to the free end of a vibration plate 52 and if the vibration excursions exceed the separation to one of the contacts 54, 55 an electric circuit 53 is grounded as indication of vibration or movement. The described component, in the example given by U.S. Pat. No. 6,195,571, is used in addition to a vibrating device that provides the tactile vibrations for silent call announcing. Such added component incurs extra expenditure and also takes up space.

The present invention is based on the use of electromechanical actuators, such as vibrators, which are common components in portable telecommunication devices, and which typically are provided with a small DC motor driving an eccentric weight. When the device, such as a mobile phone, is moved rapidly, for example shaken, the eccentric weight will turn the rotor of electric motor. This movement of the rotor induces a small inductive voltage, typically approximately 10 mV, in the stator coil. This induced voltage can be measured and used as a control signal for controlling a desired operation, such as switching the telecommunication device to a specific mode, such as voice command mode. The user interface according to the present invention is thus characterized by the fact that a common actuator already existing in the portable telecommunication device, is used 'reversely', by measuring an electric signal when the device is shaken or moved otherwise by the user in a corresponding manner.

Characteristic features of the present invention are in detail presented in the enclosed claims.

The present invention has several advantages: No additional components are needed for controlling the device when this is done without pressing keys, as an existing vibrator unit or some other actuator provided with means operating in a similar manner can be used by the user interface for controlling the operation of the device. The user can give commands to the device simply by for example shaking the device.

BRIEF DESCRIPTION OF THE DRAWINGS

In the following, the invention will be described in more detail with reference to the appended drawings, in which FIG. 1 illustrates a mobile terminal with a vibrator, FIG. 2 illustrates a vibrator unit, FIG. 3 illustrates a flat vibrator unit, FIG. 4 illustrates typical linear vibrators.

DETAILED DESCRIPTION OF THE INVENTION

Figure 4A:
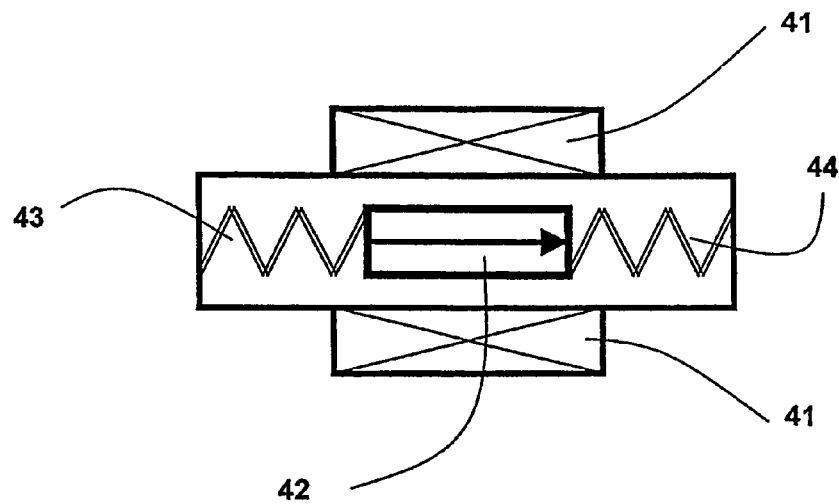
FIG. 4a illustrates a linear vibrator with spring centering.

FIG. 1 illustrates a cellular phone, mobile terminal or a media terminal 20 with a keypad 22 and a vibrator unit 25 that is contained within the enclosure and where vibration is generated by an eccentric weight 24 attached to the vibrator shaft that in this example is parallel with the side of the terminal. Other locations and directions of the vibrator shaft can be envisaged as well. With the direction of the vibrator shaft as shown, the vibrations mainly takes place in the plane depicted by the arrows 26. The vibrator 25 is controlled by a control unit 21 and is also connected to a measuring unit 23. FIG. 2 illustrates the vibrator unit with the eccentric mass 12, that is rotated by the electric motor 13 when a vibratory effect is desired, for example to silently announce an in-coming call. FIG. 3 illustrates another vibrator, with a more flat form factor made possible by the use of a pancake motor 14 driving the eccentric mass 15. The operation of the described vibrators are basically similar.

The present invention is based on the use of the vibrator unit 25 as a trigger giving a control signal for a desired control operation, such as switching the telecommunication device to a specific mode, for example voice command mode. This control signal is generated by shaking the phone 1 substantially in the direction of any of the arrows 26 in FIG. 1. Other directions containing a resultant in the plane of the arrows is possible as well, but at the cost of some sensitivity. When the phone is shaken, in a preferred direction as described in the user's manual, the eccentric weight 12 will turn the rotor of electric motor 13. This movement of the rotor induces a small inductive voltage, typically approximately 10 mV in a coil of the motor 13, typically the stator coil. This induced voltage is measured by measuring unit 23, and a control signal is generated in the control unit 21 when the voltage exceeds a predefined threshold voltage, for example 5 mV.

According to another aspect of the invention, a linear vibrator can be used instead of the rotary vibrator without changing the basic characteristics of the invention.

In many instances linear vibrators can advantageously be used instead of rotating eccentric vibrators, typically in order to generate stronger tactile effects. Such linear vibrators are used in commercial products incorporating haptic and/or tactile sensory effects.

FIG. 4 illustrates the working principle of two typical commercial linear vibrators. Common for both versions is a solenoid coil 41 wound around a cylindrical coil form containing a reciprocating magnetic core 42. The cylindrical magnetic core 42 is arranged to be free to move back and forth inside the solenoid coil 41 with low or no friction.

The core 42 is magnetically biased or magnetized and any magnetic field generated by the solenoid 41 will either oppose or strengthen the magnetic field of the core. When strengthening the field the core will align with the solenoid field and try to position itself as symmetrically as possible with the field of the solenoid coil. When the fields are arranged to oppose each other the core will be forced out from the center position by the opposing magnetic fields.

Figure 6:
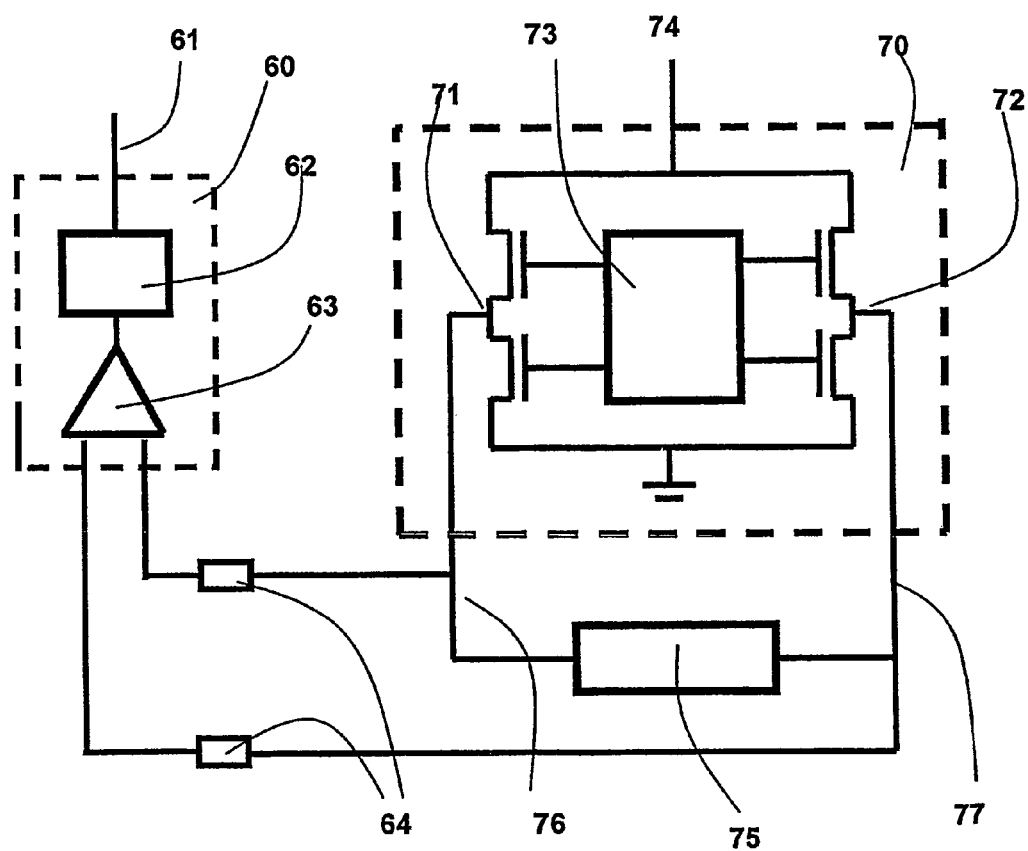
FIG. 6 illustrates a driving and sensing arrangement for a solenoid.

FIG. 6 illustrates a full bridge solenoid measuring 60 and driving 70 arrangement. Basically the driver arrangement can drive the current generated by the full battery voltage 74 either way through the solenoid 75. Additionally, for the purpose of the present invention, preferably a differential amplifier 63 is connected to the drive lines 76 and 77. In many cases a non-differential amplifier is sufficient if the signal level is adequate. The output of the amplifier 63 is arranged to be proportional to voltages across the solenoid coil regardless of their polarity.

The same measuring setup 60, 61, 62, 63, 64 can be used to measure voltages generated by a rotary vibrator. In this case the callout number 75 identifies the stator winding of the vibrator. In most cases a reversible or bridge output is not needed for a rotary vibrator. A serial switch directly controlled by the mobile phone circuitry in a per se known manner is sufficient. The drawback of only using a serial switch is that the vibratory device cannot be braked. A separate switch short circuiting the vibrator device in order to generate a braking effect is however easy to arrange in most devices whenever a braking capability is desired.

FIG. 4a illustrates how two springs 43, 44 are used to prevent the core from making larger excursions from the center position. These springs can also advantageously be arranged to have a suitable spring coefficient in order to reverse the movement of the core with substantially the same speed if the core driving signal is switched off after accelerating the core outwards. For faster buildup of mechanical oscillations the core driving signal can also be reversed, but this will additionally need a core position or core speed sensor to handle the timing, especially if the vibration frequency varies.

Figure 4B:
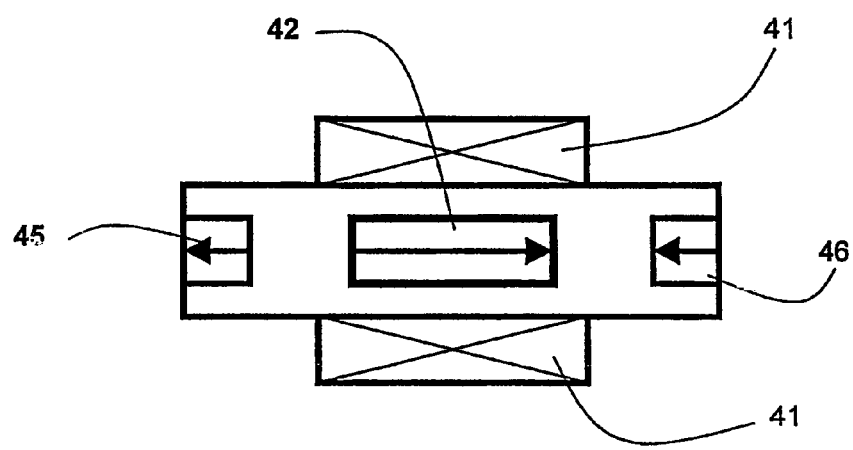
FIG. 4b illustrates a linear vibrator with magnetic centering.
Figure 5:
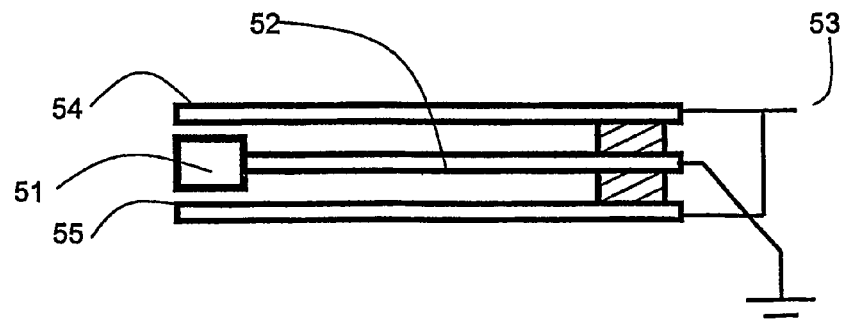
FIG. 5 illustrates a prior art movement detector.

FIG. 4b illustrated how the springs 42, 43 can be replaced by magnets 45, 46, each arranged to oppose the corresponding magnet polarity of the corresponding end of the moving core 42. The increasingly stronger magnetic repulsive force will in this case act as the returning spring force.

FIG. 6 illustrates the use of a measuring unit 60, similar to the measuring unit 23 in FIG. 1, and a control unit 70.

The inputs of the sensitive differential amplifier 63 in the measuring unit are protected from the high solenoid or stator winding voltages by using high impedance resistors 64 connected to the drivelines 76, 77 of the solenoid or vibrator 75. The output of the amplifier 63 is connected to a threshold detector 62, and the output signal of the threshold detector can be used for a desired control operation, such as switching a telecommunications device to a specific mode. During active operation of the vibrator the output 61 can be defeated.

When soundless alert is desired, the drive electronics 73 for the output driver pairs 71 and 72 will drive a alternating square wave signal through the solenoid 75. The current is derived from the terminal supply 74.

In the first aspect of the invention, even a partial rotation of the vibrator motor generated an electromotoric force in the motor windings. In the second aspect of the invention, any linear movement inwards or outwards of the core will induce an electromotoric force in the coil winding, the polarity of which depends on the movement direction.

In order to make the vibrator sensitive in directions perpendicular to the shaft, the eccentric weight must be prevented from stopping in such a position that the axis of a prescribed shake movement passes through the vibrator shaft center. The vibrator 11 can be mounted in a position and direction where it is always sensitive to a prescribed movement by the user and additionally the eccentric rotor can be made to stop in a certain preferred rotational position or in certain preferred rotational positions by using to advantage the inherent magnetic rotor fields of a rotary vibration motor. If these fields are not enough, they can be enhanced by the addition of an external magnet arranged to act directly on the eccentric weight to guarantee a preferred idle position.

The drive means 70 can also be arranged to brake the vibrator at the end of a vibrative announcement. The final braking position can advantageously be the preferred idle position or one of the preferred idle positions. The braking action is used in two ways. The first is to dampen any remaining oscillations and thus prepare the vibrator for immediate user input. The other is to stop a rotary vibrator at a preferred position.

One advantage with the second aspect of the invention is that there is no situation where movement in a predescribed direction will not generate a voltage in the coil, and no special arrangements are needed to ensure a certain idle rotational position. However, the linear vibrators has one plane in which it is insensitive for user commands. This can be mitigated by mounting the whole assembly to pivot usymmetrically when subjected to such force. The resulting vector of the original force can then be detected.

The advantage of the invention is that no additional components are needed to implement the user interface according to the invention. In prior art solutions, separate sensors are used to sense movement or shaking, and this will incure extra costs and increase complexity.

Only the absolute value is used for the purpose of the invention, although it can be envisaged that in certain applications it could be advantageous to detect the initial shaking direction using a modified threshold detector 62 with two outputs 61, one for each direction.

It is obvious to the person skilled in the art that different embodiments of the invention are not limited to the example described above, but that they may be varied within the scope of the enclosed claims. The commands given by shaking the phone can be used as parallel user interface system to a normal keypad command system.

The invention claimed is:

1. User interface for providing operational input to a portable telecommunication device without using keys, the user interface comprising:
    an electromechanical actuator including an electrical drive means provided with supply means for electrical power and a movable means arranged in relation to the electrical drive means in such a way that the movable means performs a mechanical movement when electrical power is supplied to the electrical drive means, and wherein an electric signal is induced in the drive means when the portable telecommunication device is moved in a way that causes the movable means to move, and
    a sensing unit for sensing the induced electrical signal, wherein the user interface further comprises:
    a control means for controlling a desired operation of portable telecommunication device by means of the signal induced in the drive means, wherein the control means include means for stopping the movable means in a position that makes it possible for it to move when the portable telecommunication device is moved.

2. User interface as defined in claim 1, wherein the control means includes means for providing a control signal used for switching a function on/off.

3. User interface as defined in claim 1, wherein the control means includes means for providing a control signal used for switching the telecommunication device to a specific mode.

4. User interface as defined in claim 1, wherein the control means includes means for stopping the movement of the movable means before the portable telecommunication device is switched to a induced electrical signal operation mode.

5. User interface as defined in claim 1, wherein the control means includes means for providing an identification signal for informing the user that the portable telecommunication device is switched to a induced electrical signal operation mode.

6. User interface as defined in claim 1, wherein the sensing unit includes means for providing an identification signal identifying the direction of movement of the movable means.

7. User interface as defined in claim 1, wherein the electromechanical actuator is a rotating electric motor provided with rotating eccentric means.

8. User interface as defined in claim 1, wherein the electromechanical actuator is a linear electric actuator provided with coil means and a moving magnetic core.

9. User interface as defined in claim 1, wherein the sensing unit comprises an amplifier and a threshold unit whereby a control signal is generated in the control unit when the voltage exceeds a predefined threshold voltage.

10. Use of an electromechanical actuator including an electrical drive means provided with supply means for electrical power and a movable means arranged in relation to the electrical drive means in such a way that the movable means performs a mechanical movement when electrical power is supplied to the electrical drive means, control means including means for stopping the movable means in such a position that makes it possible for the movable means to move when the portable telecommunication device is moved, and wherein an electric signal is induced in the electrical drive means when the portable telecommunication device is moved in a way that causes the movable means to move, as a user interface for providing operational input to the portable telecommunication device without using keys for providing operational input in the portable telecommunication device.

11. A portable telecommunication device comprising:
    a user interface for providing operational input to a portable telecommunication device without using keys, the user interface comprising an electromechanical actuator including an electrical drive means provided with supply means for electrical power and a movable means arranged in relation to the electrical drive means in such a way that the movable means performs a mechanical movement when electrical power is supplied to the electrical drive means, and wherein an electric signal is induced in the electrical drive means when the portable telecommunication device is moved in a way that causes the movable means to move,
    a sensing unit for sensing the induced electrical signal, and
    a controller for controlling a desired operation of the portable telecommunication device by means of the signal induced in the electrical drive means, the controller including means for stopping the movable means in such a position that makes it possible for it to move when the portable telecommunication device is moved.

12. A portable telecommunication device as defined in claim 11, wherein the electromechanical actuator is a rotating electric motor provided with rotating eccentric means.

13. A portable telecommunication device as defined in claim 11, wherein the electromechanical actuator is a linear electric actuator provided with coil means and a moving magnetic core.

14. A portable telecommunication device as defined in claim 13, further comprising a keypad coupled to the controller.

15. A portable telecommunication device as defined in claim 14, wherein the portable telecommunication device is a cellular phone.

16. A portable telecommunication device as defined in claim 11, wherein the portable telecommunication device is moved in a way corresponding to shaking the portable telecommunication device.

* * * * *

UNITED STATES PATENT AND TRADEMARK OFFICE
CERTIFICATE OF CORRECTION

| | |
|---|---|
| PATENT NO. | : 7,593,748 B2 |
| APPLICATION NO. | : 10/509528 |
| DATED | : September 22, 2009 |
| INVENTOR(S) | : Korhonen et al. |

It is certified that error appears in the above-identified patent and that said Letters Patent is hereby corrected as shown below:

On the Cover page, (*) Notice: Subject to any disclaimer, the term of this patent is extended or adjusted under 35 USC 154(b) by (379) days.

Delete the phrase "by 379 days" and insert -- by 417 days --.

Signed and Sealed this

Tenth Day of August, 2010

David J. Kappos
*Director of the United States Patent and Trademark Office*